United States Patent [19]
Hagood et al.

[11] 3,798,570
[45] Mar. 19, 1974

[54] LASER SYSTEM INCORPORATING A FIELD EFFECT EMITTER

[75] Inventors: Jerry W. Hagood; Charles M. Cason, III; Joe Shelton, all of Huntsville, Ala.

[73] Assignee: The United States of America as represented by the Secretary of the Army, Washington, D.C.

[22] Filed: Mar. 29, 1973

[21] Appl. No.: 346,200

[52] U.S. Cl. ............... 331/94.5, 330/4.3, 313/336, 313/346 R
[51] Int. Cl. ............................................. H01s 3/09
[58] Field of Search ................ 331/94.5; 315/242 T; 313/336, 346; 330/4.3

[56] References Cited
UNITED STATES PATENTS
3,745,402   7/1973   Shelton et al. ................... 313/336 X OTHER PUBLICATIONS
Gentsch et al., Zietschrift fur Naturforschung, vol. 26a, June, 1971, pp. 1,010–16.

Primary Examiner—Ronald L. Wibert
Assistant Examiner—Robert J. Webster
Attorney, Agent, or Firm—Edward J. Kelly; Herbert Berl; Jack W. Voigt

[57] ABSTRACT

An improved laser system is provided which increases laser efficiency, reduces power consumption and affords simplified construction. The improved laser, which can include any one of several electric pulsed systems, is capable of operating over an extended energy and duty cycle range. In operation only the electrical energy that contributes to the lasing action is drained from the energy source, thus greatly increasing the efficiency of the overall system. A mechanically biasable field effect electron emitter functions as either an active part of the laser or as an adjustable current controlling device, for controlling the period of lasing action.

9 Claims, 7 Drawing Figures

PATENTED MAR 19 1974 3,798,570

LASER SYSTEM INCORPORATING A FIELD EFFECT EMITTER

BACKGROUND OF THE INVENTION

In prior art electric pulsed laser systems an energy source supplys large amounts of energy for short periods of time to a laser, with the lasing action resulting from an interaction such as between an electron and gas molecule. Typically, the supply electrical energy is stored in a capacitor bank, used as an electrical energy storage device, until it is applied to the laser system. In this type of system the energy source is connected to the laser for a short time, depleting about 10–20 percent of the energy after which the remaining energy is crowbared which isolates the surplus energy from the laser. Isolation occurs after the source voltage level has been reduced by some selected value, and is necessary to keep the energy source from overheating the laser or to prevent instability formation to the point where the laser is destroyed, since the electric energy supply source cannot be quickly turned off. The resulting electrical energy storage system is large, inefficient, and requires premium components in the energy storage system to withstand the strain due to complete discharging. The number of laser pulses possible per second is limited by the charging time of the energy storage device since it presently must be completely discharged for each laser pulse.

Typical of prior art capacitor discharge systems, U.S. Pat. No. 3,417,288 to C. M. Cason, III teaches a pulse power supply wherein a power source charges a capacitor and the capacitor discharges through the load until interrupted. After the capacitor is disconnected from the load it is recharged in preparation for the next period of discharge.

Conventional systems also employ cathode emission, wherein a thermionic emitter is used which extends the length of the laser cavity. The thermionic emitter must be maintained at a required elevated temperature with very little variation in temperature throughout its length for uniform flow of electrons to be obtained. A cloud of low energy electrons is present in the space immediately above the thermionic emitter and is attracted to a foil window upon application of accelerating voltage. Coupling of accelerated electrons into the laser cavity is done as they pass through the very thin metal foils. A finite time is required for the voltage to build up to the point where the electrons will have enough energy to penetrate the foil and contribute to the lasing action. Initially some low energy electrons are attracted to the foil where they are absorbed and give up their energy to the foil. The heat generated in the foil by absorbed electrons can cause its destruction and failure of the laser. Electrons with energies in excess of 150,000 volts are usually required for good foil penetration and lasing action. Data shown in FIG. 7 of the drawings is used to estimate foil heating and indicates that the majority of electrons with energies corresponding to the lower potentials, due to the finite rise time, are absorbed by and results in foil heating.

SUMMARY OF THE INVENTION

The improved laser system has two field effect, current controlling, components, each one used in a separate electrical power supply loop. These current controlling components use multiple electron emitters for field effect cathodes. Practical operation is afforded by field emission of electrons from a vast plurality of very small metal fibers having sharpened tips. The cathode structure may be variably spaced inside an evacuated chamber behind an accelerating electrode. The accelerating electrode may function as a thin foil window when the component is used as an electron gun and as a plate when the component is used as a control diode. The variation in spacing controls the lowest level of voltage across the component for current conduction due to the field emission effect of the fiber tips. The electron gun shoots a large area beam of high energy electrons through an approximately planar surface foil window to couple them into laser gas in a laser cavity. These high energy electrons in the beam efficiently ionize laser molecules into an electrical conducting plasma whose free charges are near prevailing ambient temperature. The control diode allows current at high voltage to flow from a pumping power supply to conduct through the ionized plasma and thereby pump laser levels. Both the electron gun and the control diode may be driven by an energy source which decreases its voltage in response to its energy being removed as for example, a discharging capacitor. As the loaded respective power supply voltages fall below the lowest level to support electric field emission, current conduction rapidly ceases, thereby saving the remainder of the energy stored within the power supplies.

The respective power source is then recharged rapidly to the desired voltage level immediately following the automatic self-turn-off function after each pulse. No low energy electrons are released in the gun to cause foil heating because conduction automatically ceases at the preselected lower voltage level, preventing the supply voltage from dropping to the lower voltage levels. The energy source does not require the usual short-circuiting crowbar to dump the energy. Electron energy contributing to the ionizing or pumping process is used, essentially no low energy electrons are produced or absorbed by the foil window, heat buildup is reduced, and the need for laser cooling equipment is similarly reduced.

DESCRIPTION OF THE PREFERRED EMBODIMENT

Figure 1:
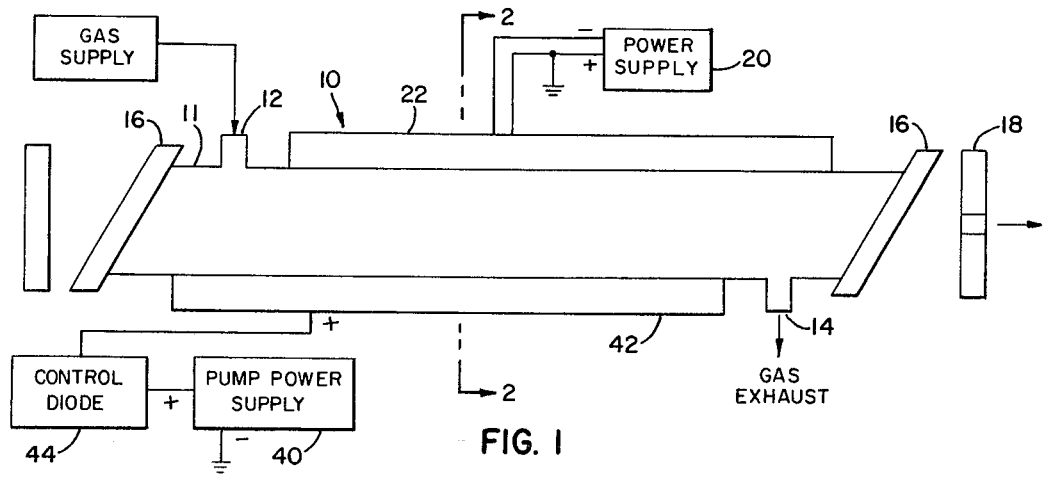
FIG. 1 is a simplified diagrammatic view of a preferred embodiment of an improved laser system with extraneous structure omitted.

Referring now to the drawings wherein like numerals represent like parts, FIG. 1 discloses a simplified, diagrammatic view of the laser. In this typical system the laser 10 comprises a dielectric box 11 fitted with a gas intake manifold attachment 12 at one end for introducing appropriate gases. A gas mixture supplied to the tube at port 12 flows through the length thereof exiting through an exhaust port 14 at the other end of the tube. For a continuous flow during operation, the individual constituents, such as $CO_2$, $N_2$, and He, or CO or HCl or other gas laser would be monitored by flow meters for proper consistency. For non-flowing single pulse operation the inlet and outlet ports or valves would be closed off when the tube is uniformly filled with gases. Typically, the ends of the laser tube can be closed with a germanium or rock salt flat 16 and the output mirror 18 can be partially coated to reflect a portion of the optical energy back into the system. Obviously, various embodiments of laser mediums may be employed. A mechanically biasable diode assembly 22 extends along the length of laser tube 11 for coupling electron energy into the laser cavity and for pumping laser levels across the width thereof. A power source 20 provides periodic pulses of direct current power to diode assembly 22. Similarly, a drift power anode assembly 42 is diametrically opposed from the diode assembly 22 along the laser tube. A pump power supply 40 provides periodic pulses of direct current power through a control diode assembly 44 to power anode assembly 42. The control diode assembly 44 automatically turns off the drift pump power supply 40 at a predetermined voltage. Power sources 20 and 40 may comprise a capacitor bank and charging unit similar to that of U.S. Pat. Nos. 3,609,588 or 3,417,288, but need not be complex.

Figure 2:
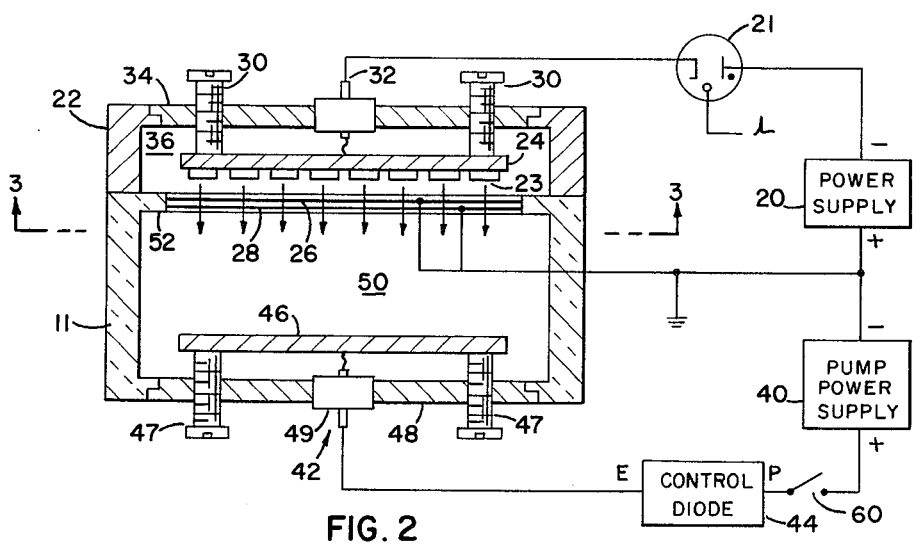
FIG. 2 is a sectional view along the lines 2—2 of FIG. 1 showing the diode chamber and the laser cavity.
Figure 3:
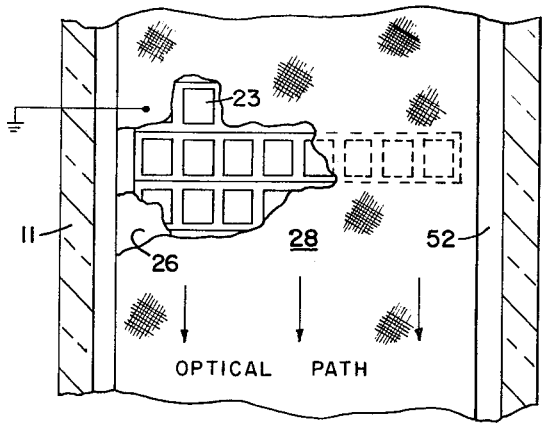
FIG. 3 is a view along the lines 3—3 of FIG. 2 showing the foil window between the electron gun chamber and the laser cavity.

FIGS. 2 and 3 more clearly disclose the coupling of the diode assemblies to the laser for pumping the laser. Biasable diode assembly 22 has a field effect electron emitter composite (FEEE) 23 attached to a conducting support plate 24 and extending substantially along the length of laser cavity 50. Composite emitter 23 functions as an electron gun and could also be in a coaxial, concentric, cylinder geometry as well as the planar configuration of FIG. 2. A window section 52 in the wall of the laser cavity allows electrons from emitter 23 to pass into the cavity. Cavity 50 contains gas at a higher absolute pressure than is required for proper operation of emitter 23. Therefore window 52 is comprised of a metal foil 26 supported by a wire mesh 28, as shown in FIG. 3. The foil and supporting mesh function as an accelerating anode plate for the gun assembly. The thin foil window allows high velocity electrons to pass through and into the lasing cavity while maintaining the diode gun chamber at a vacuum. Feed through bushing screws 30 are coupled to backing plate 24 and project external of gun assembly 22 for adjusting emitter-accelerator spacing. Obviously other methods may be used to vary the spacing between the foil and emitter. Negative voltage from the gun power supply 20 is supplied to the emitter through a terminal 32 whereas the foil anode 26 is attached to ground which is positive for this power source. Shown separately from power source 20 but forming a part thereof, a hydrogen thyratron 21 or other gas tube having similar current carrying characteristics is coupled between emitter terminal 32 and the negative output of the power source 20. The thyratron functions as a switch to pulse the laser when trigger voltage is applied thereto. An insulating plate 34 with vacuum seals is used to isolate the high voltage and to maintain the required pressure seals of the emitter chamber 36.

Similarly, pump power source 40 has the negative terminal in common with the grid 28 and ground. The positive output of power supply 40 is connected to the plate of control diode 44 and the FEEE of diode 44 is coupled to the drift power anode assembly 42, the circuit being completed through the gas in laser chamber 50. Control diode 44 may be of similar construction as diode assembly 22 but on a smaller scale. Switching means 60 (schematically represented as a simple switch) may be present between diode 44 and the positive output of power supply 40, or otherwise conveniently located to activate simultaneously with thyratron 21 or separably to apply power across the control diode and the laser medium. Power anode assembly 42 may comprise support members 47 for adjustably spacing an anode structure 46 from grid 28 and screen 26. An electrical feedthrough 49 couples plate 46 to the emitter of diode 44.

During operation laser gas in chamber 50 is ionized by electrons from emitter 23 which penetrate the foil window 26 and by pump current from power source 40 through grid 28 to the pump electrode 46 and back through control diode 44. The electric field required for operation of the field effect electron emitter 23 is developed between emitter 23 and foil anode 26 immediately upon activation of thyratron 21 by external triggering and emitter 23 terminates current flow in the circuit after the voltage reduces to a predetermined level. Similarly, control diode 44 terminates current flow when the voltage from pump power source 40 is reduced to a predetermined level. Spacing between the respective electrodes of diodes 22 and 44 may be used to provide termination of current flow simultaneously even though the field developed across respective diodes is unequal allowing the laser to be pulsed simultaneously by both power sources or staggered, as desired. The thyratron switching means obviously resets automatically when current flow ceases. For CO, HCl and $CO_2$ the electron beam produces a plasma in laser chamber 50 of the laser gas when it is pumped only from supply 40. For $Ar^+$ and $Kr^+$ laser operation is achieved in the conventional manner by introducing an operating gas into an optical path in cavity 50 and exciting the gas by interaction with high energy electrons emitted only from FEEE 23.

The field effect electron emitter is an oxide-metal matrix comprising ordered metal fibers separated by an insulating oxide. The emitter may be similar to that disclosed by Shelton et al in patent application Ser. No. 209,328 filed Dec. 17, 1971, now U.S. Pat. No. 3,745,402 issued July 10, 1973. The emitter may comprise more than a million fibers arranged in parallel for each square centimeter of surface area with the ends of the fibers forming the emitter surface. The fiber ends are all of substantially the same diameter, the distance between adjacent fiber ends being substantially the same. Except for boundary fibers, all fiber ends are the same distance from the associated anode so that each emitting point is subjected to the same electric field intensity.

Figure 6:
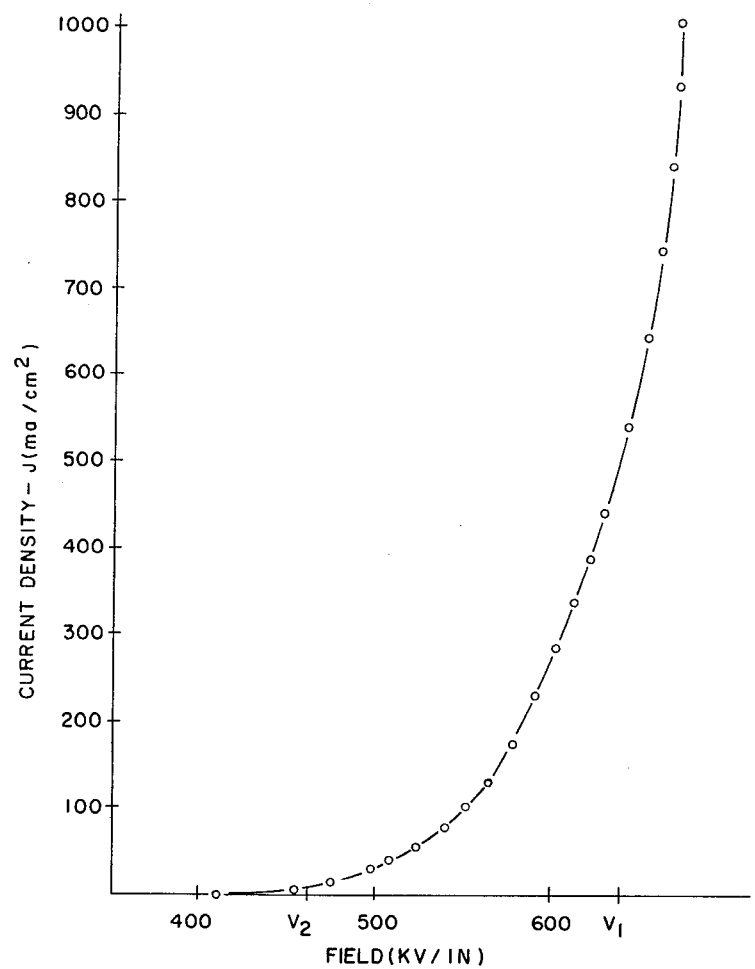
FIG. 6 is a typical graph of the electric field versus measured current density for a diode assembly with field effect electron emitter.
Figure 7:
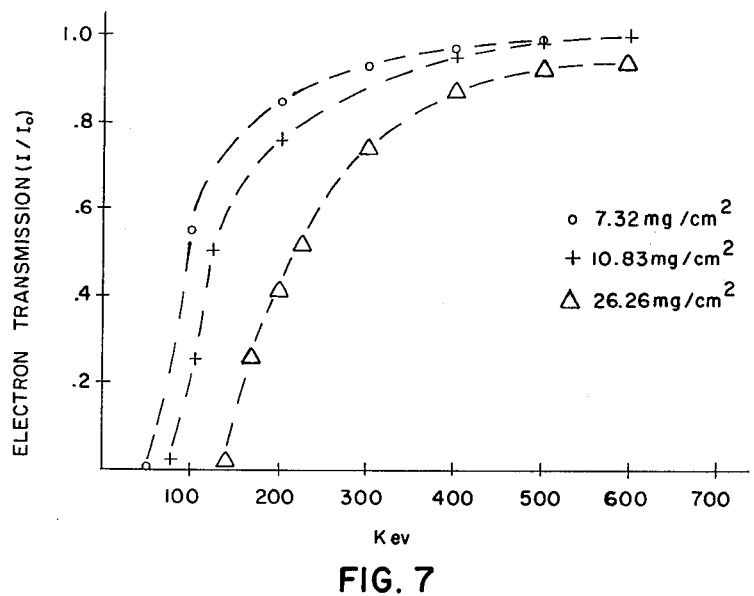
FIG. 7 is a typical graph of electron energy versus electron penetration of a thin foil window.

With the field effect electron emitter no low energy electrons are generated to damage the foil. As shown in FIG. 6, no current flows below a specified electric field intensity, therefore the finite rise time of the applied voltage produces no electrons. By properly choosing the foil (anode window) thickness and spacing from the field effect electron emitter, an efficient device can be designed for essentially any operating condition. Below the cutoff voltage, determined by spacing of the electrodes, no current flows. By establishing the cutoff point well above the level where electrons are captured by the foil (as shown in FIG. 7), conduction ceases before electron velocity is reduced to a degrading level.

Figure 4:
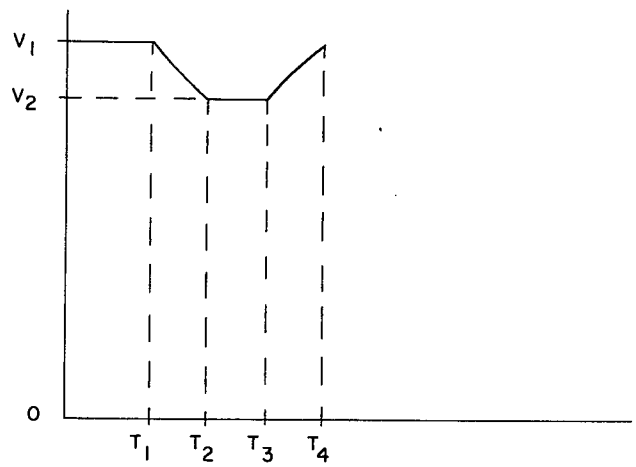
FIG. 4 is a graph of the diode controlled laser system charge-discharge cycle.
Figure 5:
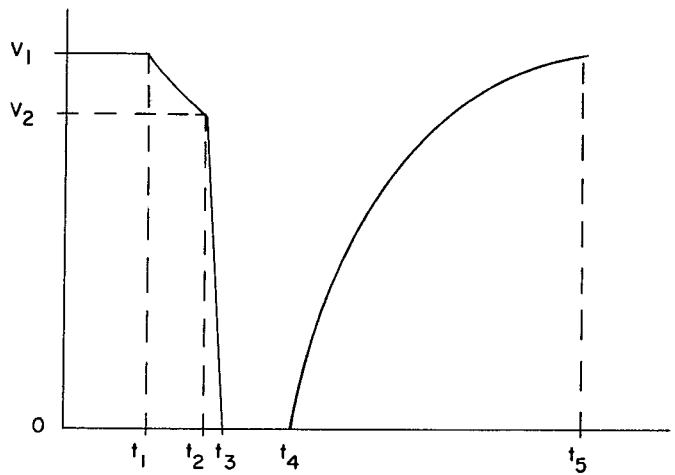
FIG. 5 is a typical graph of conventional laser system charge-discharge cycles.

FIGS. 4 and 5 show the discharge-charge cycle of the laser energy source, such as a capacitor bank, for the diode controlled laser and for the conventional laser system and indicates relative recycle time for them. FIG. 4 is representative of the operation of the diode controlled laser regardless of the configuration chosen. Current conduction occurs from time $T_1$ to $T_2$ while the energy source discharges from voltages $V_1$ to $V_2$. At $V_2$, the improved system cuts off the current flow due to the field effect characteristics. At this time the hydrogen thyratron ceases to conduct current and turns off. Thus there is no need to short-circuit the energy system. At time $T_3$ the energy source is connected to the charging system which restores the source to voltage $V_1$ at time $T_4$. Since no energy is expended to short-circuit or otherwise isolate the energy source in the improved system, only a minimum amount of energy is required to restore the source to operating condition. At time $T_4$ the system has completed one cycle of operation and the thyratron can again be fired to activate the system. The time required for charging the energy source is greatly reduced. In FIG. 5, the conventional system in present use, the energy source is connected to the laser at time $t_1$ and voltage $V_1$ and lasing begins. At time $t_2$ and voltage $V_2$ it is necessary to interrupt the current flow through the laser to protect it from damage. A short-circuit is placed across the energy source at time $T_2$ for separating the source from the load without arcing damage. The residual energy is drained off from $t_2$ to $t_3$. This energy, the majority of the energy available from the source, serves no useful purpose. At time $t_4$ the energy source is again connected to the charging system and the system is recharged to the original voltage $V_1$ to $t_5$ at which time the laser can generate another pulse of energy.

The improved laser system utilizes the field effect electron emitter in a mechanically biasable diode configuration as an active part of the lasing system. The diode assembly is also used as a current limiter for any electric pulsed laser system by inserting a diode configuration in series with existing laser pumping circuits, or it can be used for both lasing and current limiting to achieve special operating parameters. Typically, for existing laser systems employing electric discharge between electrodes through the laser medium, the mechanically biasable diode may be serially connected between the power source and one electrode in such manner as to terminate current flow when the applied power has been reduced to a predetermined voltage level. For this type of embodiment, the accelerating anode would obviously be replaced by an anode plate. Since the charging circuit does not cycle through a great range, less demand is placed on system components and reliability is increased. Thus, capacitors which are completely charged and discharged at a rapid rate as in the prior art laser systems are more likely to fail than the same capacitors maintained at near full charge level as embodied in the new system.

Although a particular embodiment and form of this invention has been illustrated, it is apparent that various modifications and embodiments in the invention may be made by those skilled in the art without departing from the scope and spirit of the foregoing disclosure. Accordingly the scope of the invention should be limited only by the claims appended hereto.

We claim:

1. In a laser system having a variable electrical pumping system the improvement comprising: a laser tube having a laser medium therein for providing coherent optical output energy therefrom; an electrical power source for pumping said laser medium to create a population inversion therein by means of an electric discharge; a diode assembly coupled between said laser and said power source for predetermined control of electron flow from said power source to said laser, said diode having a field effect cathode emitter and an anode for developing a potential and a uniform electric field therebetween to control and limit electron flow in said laser.

2. An improved laser system as set forth in claim 1 and further comprising an electron accelerating and collection assembly having an electrode screen along an inner wall of said laser and an electrode plate along an opposing inner wall of said laser for developing a potential and electron flow therebetween, said electrode screen being coupled to the negative side of said pumping power supply and said electrode plate being coupled through said diode assembly to the positive side of said power supply, the emitter of said diode assembly being coupled to the electrode plate and the anode of said diode assembly being coupled to the positive side of said power source.

3. An improved laser system as set forth in claim 2 and further comprising mechanically adjustable support means supporting said electrode plate within the laser medium for adjusting the distance of separation of said plate from said electrode screen.

4. An improved laser system as set forth in claim 2 and further comprising a second power supply, a mechanically biasable diode assembly coupled between said laser medium and said second power supply for predetermined control of electron flow from said power supply to said laser medium.

5. An improved laser system as set forth in claim 4 and further comprising an electron window between said laser tube and said mechanically biasable diode assembly for coupling said electron flow into said laser medium.

6. An improved laser system as set forth in claim 5 wherein said mechanically biasable diode assembly has a field effect electron emitter cathode and an accelerating anode foil for conductive electrodes, said foil forming said electron window for passing electron flow from said diode housing into said laser cavity, said foil being coupled to said electrode screen and to the positive output of said second power source, and said field effect cathode emitter being coupled to the negative output of said second power source.

7. An improved laser system as set forth in claim 6 and further comprising mechanically biasable means supporting said field effect cathode emitters for adjusting the distance of separation of said emitters from respective anode electrodes and thereby controlling the lower limit of electron flow therebetween.

8. An improved laser system as set forth in claim 1 and further comprising switching means coupled between a negative output of said power source and the cathode emitter of said diode for initiating current flow through the system; and wherein said diode anode is an accelerating anode forming an electron window between said laser tube and said diode assembly for coupling electron flow into said laser medium, said anode window being coupled to the positive output of said power supply.

9. An improved laser system as set forth in claim 8 wherein said electron window is foil which forms a common wall between the diode housing and said laser tube substantially along one side of the laser tube, and further comprising mechanically biasable means supporting said field effect emitter for adjusting the distance of separation of said emitter from said anode window and thereby controlling the lower limit of electron flow therebetween.

* * * * *